United States Patent [19]

Shinoda

[11] Patent Number: 4,557,577
[45] Date of Patent: Dec. 10, 1985

[54] AUTO FOCUS APPARATUS FOR A CAMERA
[75] Inventor: Nobuhiko Shinoda, Tokyo, Japan
[73] Assignee: Canon Kabushiki Kaisha, Tokyo, Japan
[21] Appl. No.: 561,935
[22] Filed: Dec. 15, 1983
[30] Foreign Application Priority Data Dec. 25, 1982 [JP] Japan .................. 57-234823

[51] Int. Cl.⁴ ............................ G03B 3/10
[52] U.S. Cl. ..................... 354/400; 354/402
[58] Field of Search ............... 354/400, 402
[56] References Cited

U.S. PATENT DOCUMENTS

Re. 31,362   8/1983  Shenk ................................ 354/402
4,289,388    9/1981  Wakabayashi et al. ............. 354/402
4,423,935    1/1984  Eguchi et al. ....................... 354/402
4,432,620    2/1984  Kurokawa .......................... 354/402
4,459,006    7/1984  Sakai et al. ......................... 354/402
4,467,187    8/1984  Tsunekawa et al. ................ 354/402

Primary Examiner—Russell E. Adams
Attorney, Agent, or Firm—Fitzpatrick, Cella, Harper & Scinto

[57] ABSTRACT

This specification discloses an auto focus apparatus for a camera, and particularly an auto focus apparatus in which an auto focus operation is allowed only within a predetermined range relative to a preset central distance and the focusing operation by a photo-taking lens is prevented from greatly deviating from the preset central distance.

9 Claims, 9 Drawing Figures

AUTO FOCUS APPARATUS FOR A CAMERA

BACKGROUND OF THE INVENTION

1. Field of the Invention

This invention relates to a camera having an automatic focus adjusting apparatus, and in particular to such a camera which is provided with a control circuit which allows a focus adjusting operation only when the main object lies within a predetermined range relative to a distance value set by the photographer, thereby preventing malfunctioning of the camera.

2. Description of the Prior Art

Usually, an automatic focus adjusting apparatus is designed to drive a photo-taking lens and effect focusing with attention paid to the focus information (amount of image deviation, sharpness, etc.) of an object caught in the vicinity of the center of the photographing picture plane (hereinafter referred to as the object caught in the distance measuring view field). Consequently, this has led to a disadvantage that when an object desired by the photographer (hereinafter referred to as the main object) deviates from the center of the photographing picture plane and cannot be caught in the distance measuring view field, a focusing operation is executed with respect to an object of photography which differs from the main object caught in the distance measuring view field. Particularly, if an automatic focus adjusting apparatus is applied to a single lens reflex camera which often employs a lens of a long focus system, the following inconveniences will occur during the use of the long focus lens:

(1) Due to high photographing magnification, it is difficult to continue to catch the main object in the distance measuring view field and therefore, the above-noted disadvantage presents itself, remarkably; and (2) The amount of lens detection is great and therefore, when an object which remarkably differs in distance from the main object is caught in the distance measuring view field, a long time is required for the focusing operation with respect to the object caught in the distance measuring view field and a long time is required before the focusing with respect to the main object is again effected, and this may lead to the missing of the photographing chance.

As a method for eliminating the above-noted disadvantages, there is known a method in which the photographer pre-divides the distance of the object to be photographed into a long distance zone, a medium distance zone and a short distance zone, pre-designates a predetermined one of these zones and effects a focusing operation only within the range of the designated zone.

That is, when the main object lies, for example, in the medium distance zone, the photographer predesignates the medium distance zone and catches the main object in the distance measuring view field and in such condition, effects a focusing operation, whereby even if the main object deviates from the distance measuring view field, the distance value with respect to which focusing has been effected is kept within the range of said zone to prevent a focusing operation from being effected at a distance value greatly deviating from the in-focus distance relative to the main object, thus ensuring a substantially allowable focus condition as a photograph for the main object.

According to this method, however, it is necessary to foresee in what zone the main object lies and it is not only necessary to make a judgment (distance forecast) contrary to the purpose of the focus adjusting apparatus directed to automatic distance adjustment, but also, where the main object lies on the boundary between the zones, accurate focusing can never be accomplished with respect to the main object if the main object moves even slightly when it is caught in the distance measuring view field.

That is, where the main object lies on the boundary between the long distance zone and the medium distance zone, if the long distance zone is designated, a focusing operation is allowed in the long distance zone when the main object deviates from the distance measuring view field and therefore, the lens can be prevented from being much out of focus with respect to the main object, but if the main object slightly moves into the medium distance zone when it is caught in the distance measuring view field, accurate focusing with respect to the main object can no longer be executed.

SUMMARY OF THE INVENTION

The present invention has been made in view of the above-noted points. According to the present invention, a control circuit which allows movement of the lens within a predetermined allowable width relative to a distance value set arbitrarily is provided so that when the main object is caught in the distance measuring view field, focusing can be accurately executed for the shift of the main object within predetermined allowable width relative to said set distance value and even when the main object deviates from the distance measuring view field, movement of the lens is inhibited at the limit position within said allowable width to thereby prevent the lens from being much out of focus with respect to the main object lying within said allowable width.

Further features of the present invention will become apparent from the following detailed description of some embodiments thereof taken in conjunction with the accompanying drawings.

DETAILED DESCRIPTION OF THE PREFERRED EMBODIMENTS

An automatic focus adjusting apparatus according to the present invention will hereinafter be described.

Figure 1:
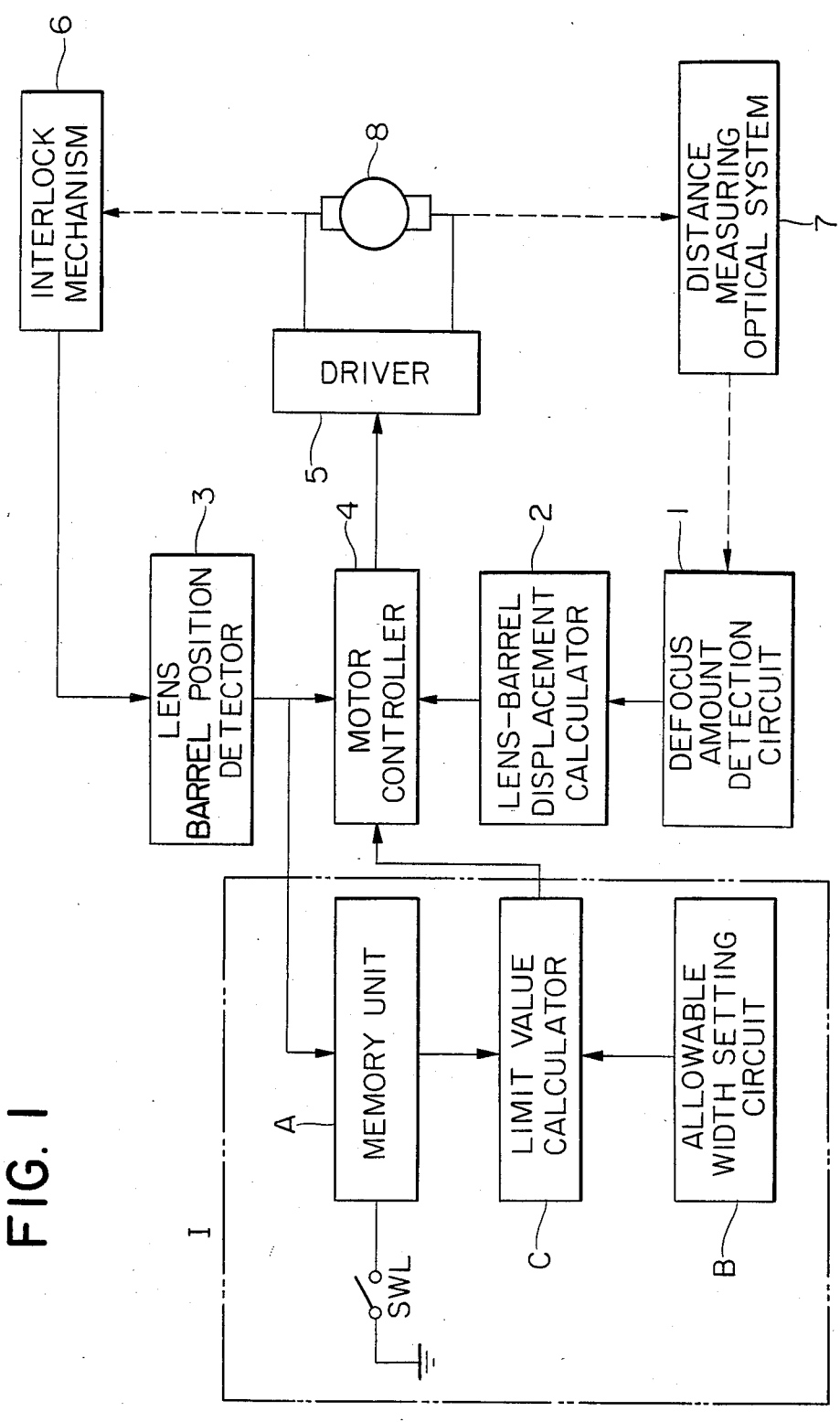
FIG. 1 is a block diagram showing an embodiment of the automatic focus adjusting apparatus according to the present invention.

FIG. 1 is a block diagram showing an embodiment of a control device for the focus adjusting apparatus according to the present invention.

In FIG. 1, reference numeral 1 designates a defocus amount detecting circuit for receiving the light from an object entering through a distance measuring optical system 7 by a sensor and finding the defocus amount information to the in-focus point on the basis of an object image signal as the sensor output. Reference numeral 2 denotes a lens barrel displacement calculating circuit for calculating the amount of movement of a photo-taking lens from the defocus amount information detected by the defocus amount detecting circuit, and reference numeral 4 designates a motor control circuit for imparting a motor control signal for controlling the direction of drive and the amount of drive of a motor 8 to the driving circuit 5 of the motor 8 on the basis of the output of the lens barrel displacement calculating circuit. Reference numeral 6 denotes an interlocking mechanism for moving the photo-taking lens barrel in response to the motor 8, and reference numeral 3 designates a lens barrel position detecting circuit for detecting the amount of movement or the position of the photo-taking lens in response to said mechanism. The information of the amount of movement or the position of the lens detected by the lens barrel position detecting circuit is imparted to the motor control circuit, which compares the output of the lens barrel displacement calculating circuit with the information of the amount of movement or the position and puts out a motor drive stopping signal to stop the drive of the motor 8 when said output and said information are coincident with each other. The distance measuring optical system is operatively associated with the motor 8 as shown, but for example, where the sensor is adapted to receive the light passed through the photo-taking lens, the distance measuring optical system need not be operatively associated with the motor 8 because in such case, the photo-taking lens is driven by the motor.

The above-mentioned reference numerals 1 to 8 designate a well-known automatic focus adjusting apparatus, and of course, any automatic focus adjusting apparatus of the type which is provided with a distance measuring circuit for detecting the object distance (the in-focus condition) and drive means such as a motor for driving the photo-taking lens by the distance measurement output and in which the photo-taking lens is moved to the in-focus position is applicable to the present invention even if it is other than the above-described embodiment.

The circuit portion I encircled by a dot-and-dash line is a control device portion according to the present invention. In the circuit portion I, SWL designates a memory switch adapted to be closed in response to an operating member such as a push button, not shown, and supply a memory signal to a memory device A. The memory device A stores therein the then photo-taking lens position information in response to said memory signal. Letter B denotes an allowable width setting circuit having constant generating means for setting a predetermined constant. Letter C designates a limit value circulating circuit adapted to operate the current lens position information stored in the memory device A and the constant from the allowable width setting circuit and calculate the position information before and after said currently stored position by said constant.

Operation of the circuit of FIG. 1 will now be described.

Let it be assumed that the automatic focus adjusting apparatus comprising the members 1 to 8 is operated and the photo-taking lens is adjusted to the in-focus condition relative to a main object. In this condition, when the switch SWL is closed, a memory signal is imparted to the memory device A, which thus stores therein the lens position information X at that point of time. The limit value calculating circuit C operates the constant information K from the allowable width setting circuit B and the lens position information X, calculates the limit value X−K on the short distance side and the limit value X+K on the long distance side, and transmits the limit value information to the motor control circuit 4.

In this condition, when it is assumed that the main object is caught in the distance measuring view field and the main object is positioned within the allowable range of X+K to X−K, focusing operation is executed by the focus adjusting apparatus while following the movement of the main object, and when the main object lies within the aforementioned allowable range but is moved to a position deviated from the distance measuring view field, the defocus amount detecting circuit calculates the amount of defocus relative to an object within the distance measuring view field which differs from the main object. Consequently, when the object within the distance measuring view field lies outside said allowable range, the photo-taking lens is moved to the in-focus position relative to said object far from the main object by the focus adjusting operation of the focus adjusting apparatus and thus, photographing is effected with the photo-taking lens being out of focus with respect to the main object.

However, as described above, in the present invention, the limit value information is put out by the limit value calculating circuit C and therefore, in the situation as described above, when the photo-taking lens has shifted to the limit value X+K or X−K, the motor control circuit 4 puts out a motor stopping signal and inhibits the driving of the lens. Consequently, even under the above-described situation, the lens always lies at the position of the limit value X+K or X−K and photographing can be executed with the lens being not so much out of focus with respect to the main object and thus, out-of-focus can be prevented.

Figure 2:
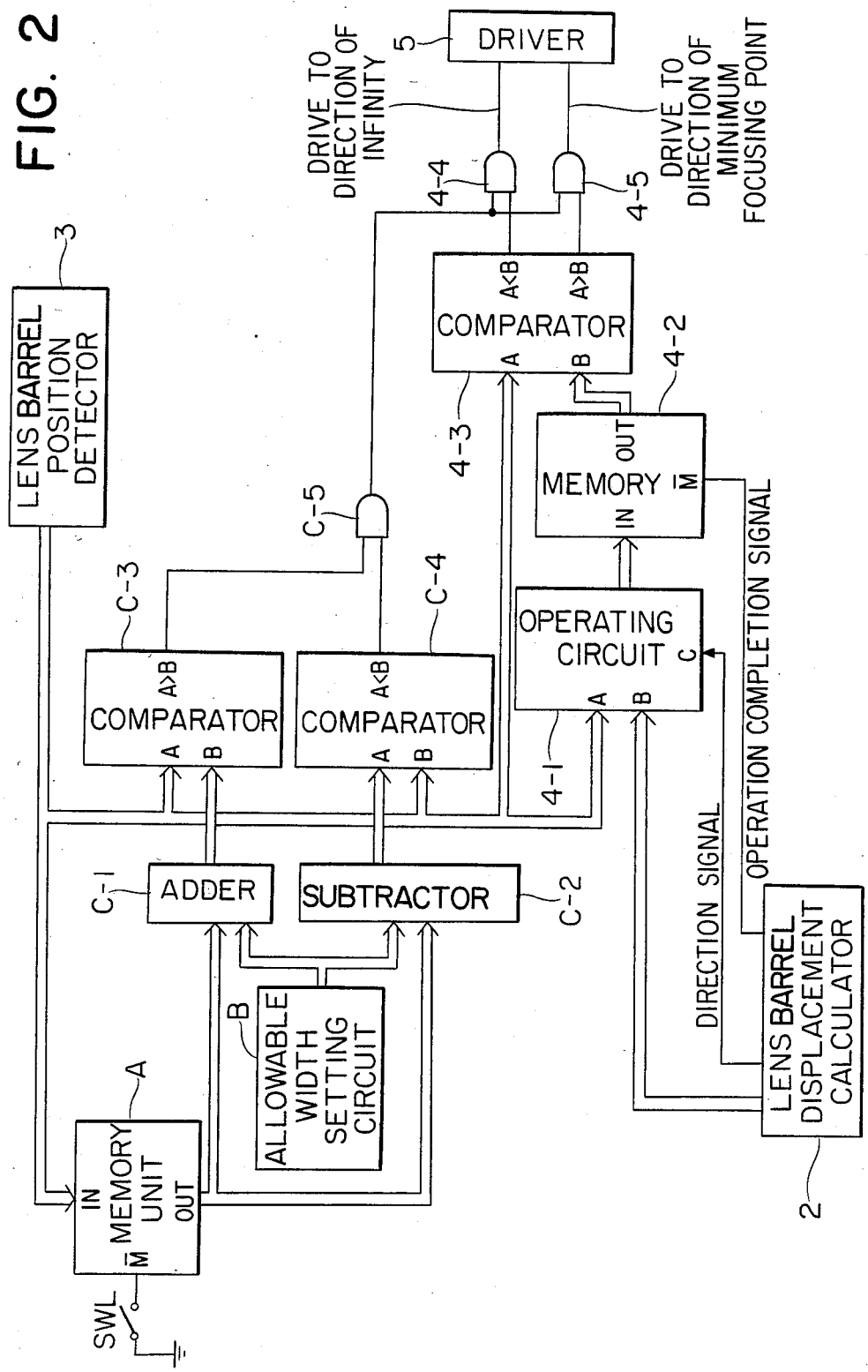
FIG. 2 is a circuit diagram showing the construction of the major portions of the block of FIG. 1.
Figure 3:
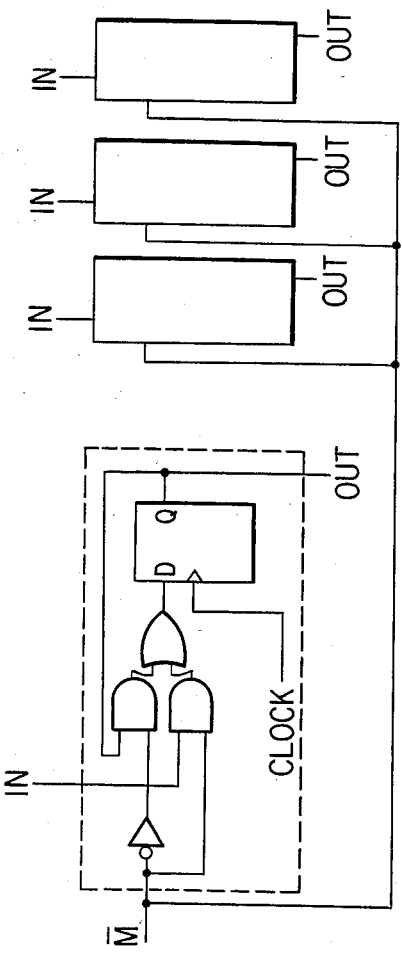
FIG. 3 is a circuit diagram showing an embodiment of the memory shown in FIG. 2.

In this block diagram, the constant K has been described as present, but of course, the constant K may be made manually variable to any value. Also, the constant K should desirably be set to such a degree of value that where it is assumed that the main object is positioned at a distance corresponding to the memory value X, the photo-taking lens is not so much out of focus even if the lens is shifted to the position of X+K or X−K. FIG. 2 is a circuit diagram showing an embodiment of the circuit portion I and motor control circuit 4 in the block diagram of FIG. 1. In FIG. 2, thick lines show multi-bit (for example, 4-bit) information lines, and thin lines show 1-bit lines. Letter A designates a memory forming the above-described memory device. The input of the memory A is connected to the output end of the lens barrel position detecting circuit 3. This memory, as shown, for example, in FIG. 3, is comprised of a plurality of D-type flip-flops, and samples the information from an input end in synchronism with a clock pulse (not shown) and holds the memory value at that point of time as long as the switch SWL is closed.

C-1 designates an adder for adding the constant K from the allowable width setting circuit B and the content of the memory A, and C-2 denotes a subtractor for subtracting the constant K from the content of the memory A. C-3 designates a comparator for comparing the current lens position information from the lens barrel position detecting circuit 3 to the input end A with the output (upper limit value) of the adder C-1 to the input end B and putting out a high level ("1") when A<B. C-4 denotes a comparator for comparing the aforementioned current position information to the input end B with the subtractor output to the input end A and putting out "1" when A<B. C-5 designates an AND gate. The adder, the substractor, the comparators and the AND gate C-5 together constitute a limit value calculating circuit.

Reference numerals 4-1 to 4-5 designate circuit portions showing an embodiment of the motor control circuit. More particularly, 4-1 designates an operation circuit for adding or subtracting the current position information to the input end A and the lens drive amount information from the lens barrel movement amount calculating circuit to the input end B by a direction signal to the input end C and obtaining the in-focus position information. Reference numeral 4-2 denotes a memory circuit for storing therein the in-focus position information from the operation circuit in response to the operation completion signal to the input end M. In the present focus adjusting apparatus, the in-focus degree operating operation and the lens driving operation are executed alternately and during the operating operation, the lens driving is inhibited and during the lens driving, the operating operation is inhibited, and said operation completion signal is put out each time the operating operation is terminated, and the content of the memory 4-2 is renewed each time the operating operation is terminated. Reference numeral 4-3 designates a comparator for comparing the current position information to the input end A with the content of the memory 4-2 to the input end B and putting out "1" from the output end a when A<B and putting out "1" from the output end b when A>B. Reference numerals 4-4 and 4-5 denote AND gates for putting out the driving signal of a motor for driving the lens on the basis of the output of the comparator 4-3. The lens is driven in the infinite distance direction by the output "1" of the AND gate 4-4 and is driven in the close distance direction by the output "1" of the AND gate 4-5.

Operation of the circuit of FIG. 2 will now be described.

Assuming that the switch SWL is opened, the current lens position information X is applied as an input to the memory A from the lens barrel position detecting circuit 3 in synchronism with a clock pulse and is renewed, and the content of the memory A always represents the current lens position information X. The lens barrel position detecting circuit is comprised, for example, of a code plate or the like adapted to be displaced in response to the interlocking mechanism and indicate a maximum value when the lens is at the infinite distance and indicate a minimum value when the lens is at the close distance, and puts out the current lens position as a digital value.

The content X of the memory A is transmitted to the adder C-1 and the subtractor C-2 and added to or subtracted from the constant K from the allowable width setting circuit B and as a result, the output of the adder C-1 becomes X+K and the output of the subtractor C-2 becomes X−K, and these outputs X+K and X−K are compared with the current position information X by the comparators B-3 and C-4. In the opened position of the switch SWL, as described above, the content X of the memory A always represents the current position and therefore, the input relation of the comparator C-3 is A<B and the input relation of the comparator C-4 also is A<B. Accordingly, as long as the switch SWL is opened, the comparators C-3 and C-4 put out "1" and the AND gate C-5 also puts out "1".

On the other hand, the information ΔD of the amount of movement of the lens from the current position to the in-focus position found by the lens barrel displacement calculating circuit 2 of FIG. 1 is applied as an input to the operation circuit 4-1, and the operation of this information ΔD and the current position information X is effected. That is, when the lens is on the close distance side from the in-focus position, a direction signal for instructing the lens to be moved in the infinite distance direction and the movement amount information ΔD are put out from the calculating circuit 2 to render the operation circuit 4-1 into an addition mode and form in-focus position information X+ΔD, and when the lens is on the infinity side from the in-focus position, the operation circuit 4-1 is rendered into a subtraction mode by the direction signal from the calculating circuit 2 and calculates in-focus position information X−ΔD. The in-focus position information from the operation circuit 4-1 is stored in the memory 4-2 in response to said operation termination signal.

Assuming that the lens is on the close distance side from the in-focus position as described above, said X+ΔD is stored as the in-focus position information in the memory 4-2. The content X+ΔD of the memory 4-2 is compared with the current position information X by the comparator 4-3 and X+ΔD>X, that is, the input relation of the memory 4-3 is A<B and therefore, "1" is put out from the output end a of the comparator 4-3 and is transmitted to the driving circuit 5 (FIG. 1) through the AND gate 4-4, whereby the lens is moved in the infinite distance direction. By the movement of the lens in the infinite distance direction, the output value of the lens barrel position detecting circuit 3 is increased and, when the lens shifts to the in-focus position X+ΔD, the input relation of the comparator 4-3 becomes A=B and the "1" signal from the AND gate 4-4 disappears and the movement of the lens is terminated, thus completing the distance adjusting operation. When the lens is on the infinite distance side from the in-focus position, "1" is put out from the output end b of the comparator 4-3 and is transmitted to the driving circuit through the AND gate 4-5, whereby the lens is moved in the close distance direction and thus, distance adjusting operation is effected.

After the distance adjusting operation has been effected in this manner, the in-focus degree operating operation is effected and the lens driving operation based on the result thereof is respetitively executed. Consequently, the lens shifts to the in-focus position while always following the movement of the object and thus, proper distance adjusting operation is always executed.

When the switch SWL is closed in the process during which the distance adjusting operation is executed in this manner, the then current lens position information is stored in the memory A and the renewal thereafter is inhibited. Assuming that the memory value of the memory A is $X_1$, this $X_1$ is operated with the constant K from the circuit B by the adder and subtractor C-1 and C-2 and as a result, $X_1+K$ is put out from the adder C-1 and $X_1-K$ is put out from the subtractor C-2.

Assuming that the object lies in a distance range corresponding to $X_1+K$ to $X_1-K$, proper distance adjusting operation is executed following the movement of the object within such range because the comparators C-3 and C-4 are putting out "1" as described above, but when the object deviates from the distance measuring view field and an object lying outside said distance range is caught in the distance measuring view field, there is an undesirable possibility that in-focus is effected with respect to an object lying at a distance entirely different from the in-focus point with respect to the object to be photographed.

However, in the embodiment of FIG. 2, when, under the situation as described above, the current lens position information assumes a value exceeding $X_1+K$ to $X_1-K$ in the process during which the lens is moved toward the in-focus point of an object different from the object to be photographed, low level ("0") is put our from the comparator C-3 or C-4 to render the output of the AND gate C-5 into "0" and also forcibly render the outputs of the AND gates 4-4 and 4-5 into "0", thereby inhibiting the driving of the lens. Consequently, even under the above-described situation, the lens is inhibited from moving at the position of $X_1+K$ or $X_1-K$ and therefore, the lens is prevented from being much out of focus with respect to the object lying within the range of $X_1+K$ to $X_1-K$.

Figure 4:
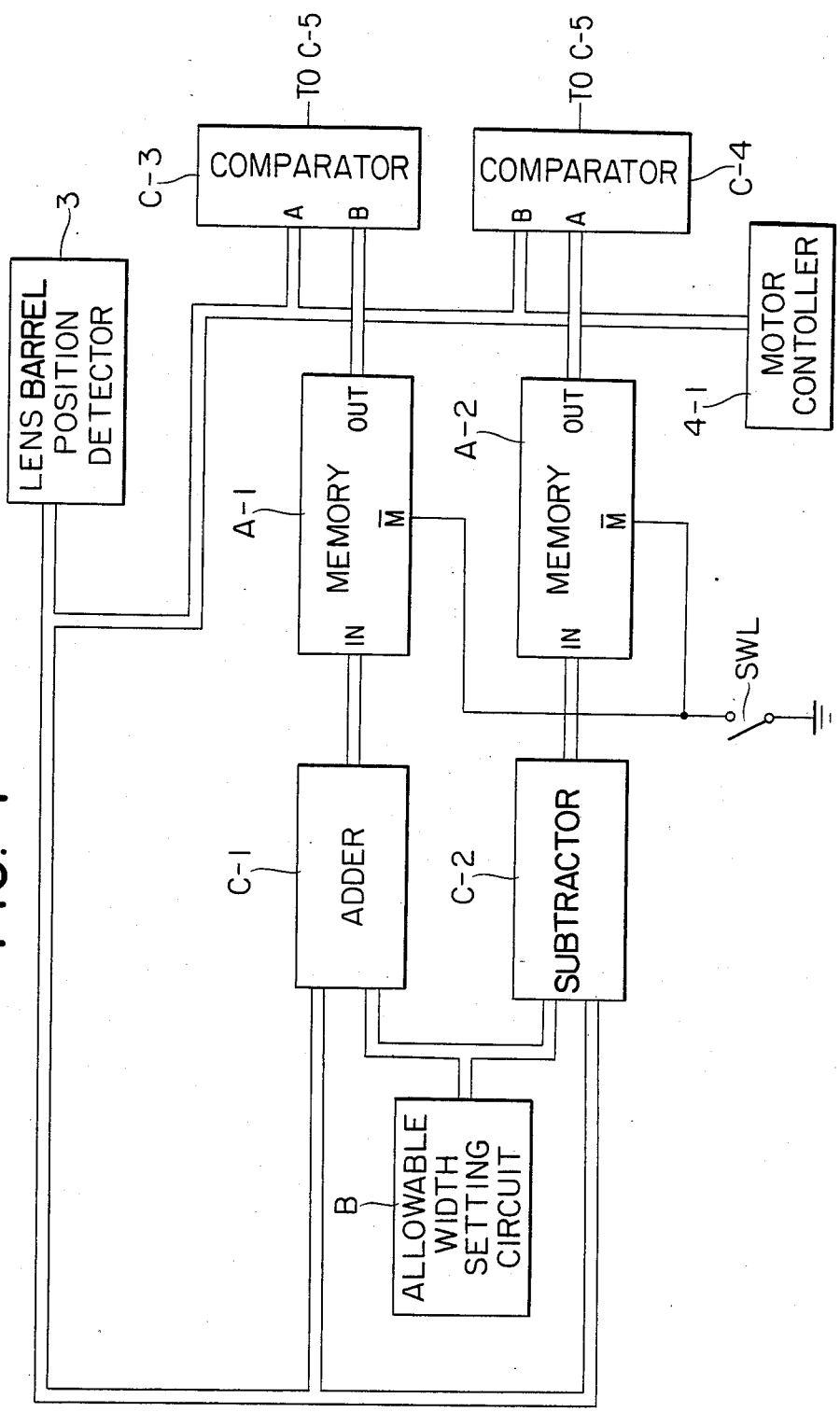
FIG. 4 is a circuit diagram showing another example of the circuit portion of FIG. 2.

FIG. 4 shows another example of the construction of the memory device and limit value calculating circuit shown in FIG. 2. In FIG. 4, portions similar to those of FIG. 2 are given similar reference characters. In FIG. 2, the current value information is stored in the memory A and the upper and lower limit values are compared with the current information by the comparators C-3 and C-4, whereas in FIG. 4, instead of causing the current value information to be stored, memories A-1 and A-2 for storing the output of the adder or the subtractor (the upper and lower limit values) by the switch SWL are provided so that the operated limit value is stored and the current value information from the lens barrel position detecting circuit 3 is compared with the stored limit value by the comparators C-3 and C-4. The construction of the motor control circuit 4 connected to the circuit portion of FIG. 4 is identical to that of the FIG. 2 embodiment and need not be described.

Figure 6:
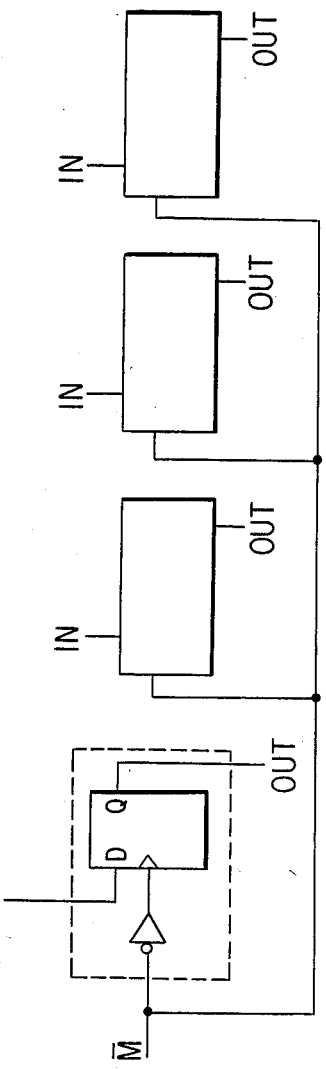
FIG. 6 is a circuit diagram showing an embodiment of the memory of FIG. 5.
Figure 5:
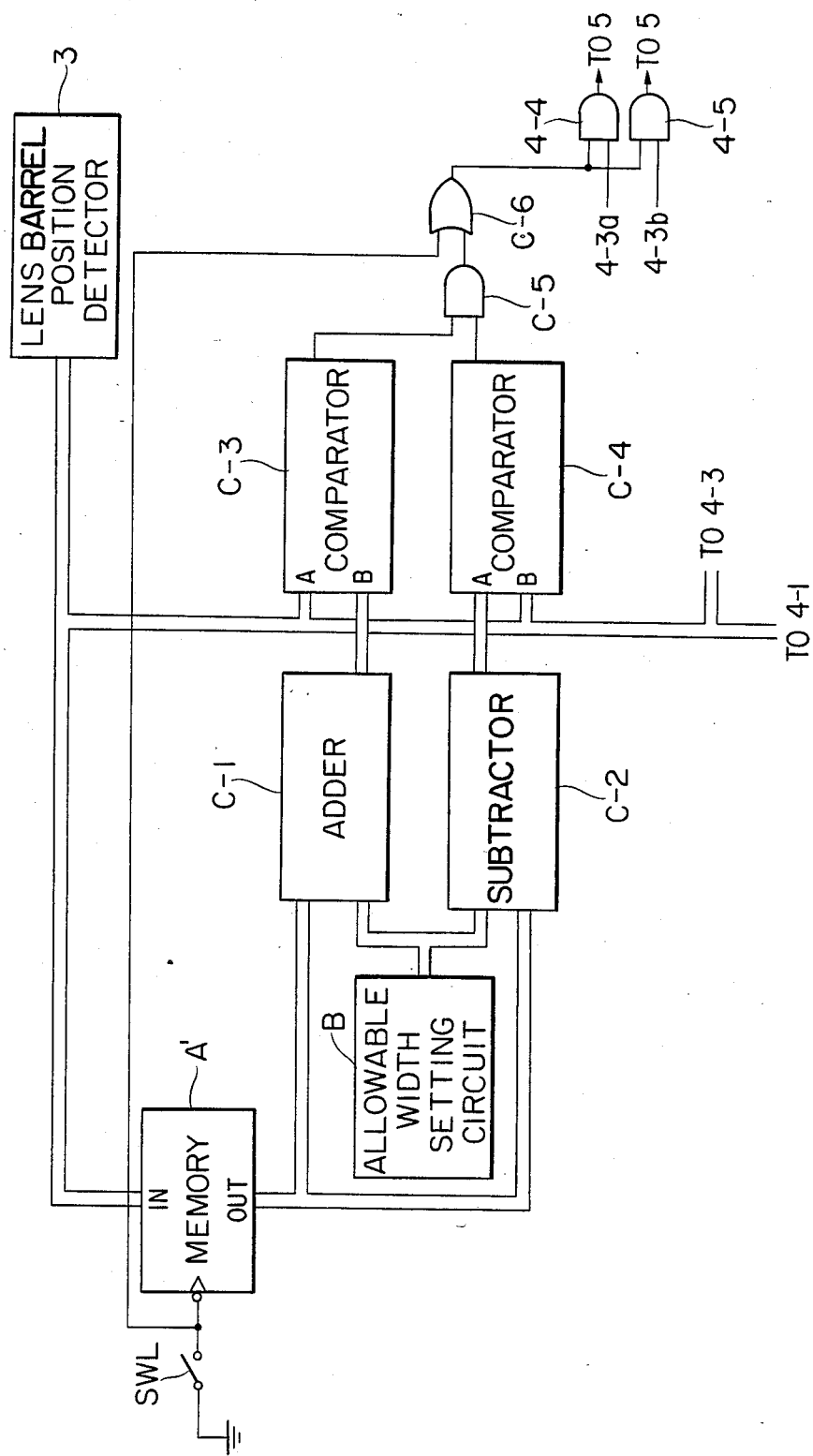
FIG. 5 is a circuit diagram showing still another example of the circuit portion of FIG. 2.

FIG. 5 is a circuit diagram showing another embodiment of the memory device and limit value calculating circuit shown in FIG. 2. In FIG. 5, portions similar to those of the FIG. 2 embodiment are given similar reference characters. A memory A' in FIG. 5 is comprised of a simple latch circuit as shown in FIG. 6, and differs from the FIG. 2 embodiment only in that only when the switch SWL is closed without the current lens position information being applied as an input, it is designed to store the current position information at that point of time and that the output of an AND gate C-5 is transmitted to the AND gates 4-4 and 4-5 of FIG. 2 through an OR gate C-6 and the switch SWL is connected to the OR gate C-6. With such construction of the FIG. 5 embodiment, whenever the switch SWL is in OFF position, "1" is applied as an input to one input end of the AND gates 4-4 and 4-5 through the OR gate C-6. Consequently, the AND gates 4-4 and 4-5 put out a driving signal to the driving circuit 5 on the basis of the output of the comparator 4-3 shown in FIG. 2 to thereby drive the lens and thus execute the lens distance adjustment based on the result of the in-focus degree operation.

Also, when the switch SWL is closed, the current lens position information at that point of time is stored in the memory A' and thereafter, as in the embodiment of FIG. 2, the AND gate C-5 puts out "1" only when the position of the lens is within the range of $X+K$ to $X-K$ determined by the constant K and the memory value X of the memory A', and puts out "0" when the position of the lens exceeds said range. Also, since the switch SWL is in its ON position, one input of the OR gate C-6 is "0" and as a result, when the switch SWL is in its ON position, the outputs ("1") of the AND gates 4-4 and 4-5 are determined only by the output condition ("1") of the AND gate C-5 as in the embodiment of FIG. 2 and thus, as described in connection with the embodiment of FIG. 2, movement of the lens is always permitted only within the range of $X+K$ to $X-K$.

Figure 7:
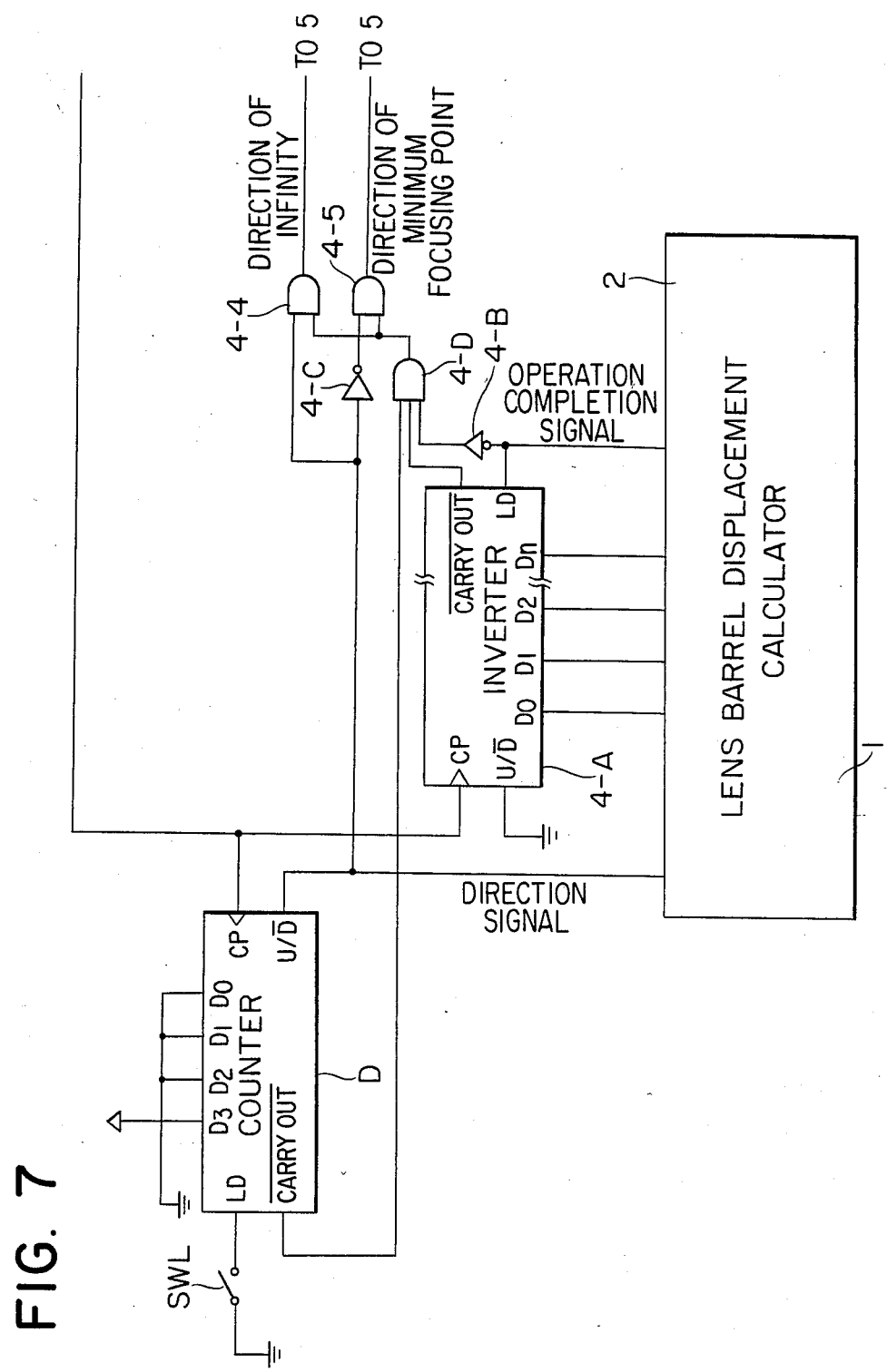
FIG. 7 is a circuit diagram showing yet still another example of the circuit portion of FIG. 2.

FIG. 7 is a circuit diagram showing another embodiment of the focus adjusting apparatus according to the present invention shown in FIG. 1.

Figure 8A:
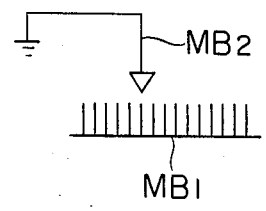
FIGS. 8A and 8B show the construction of an embodiment of the lens movement signal forming circuit.
Figure 8B:
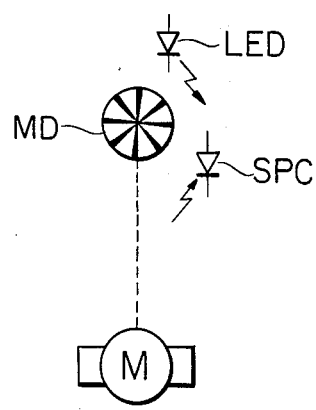

In the embodiment of FIGS. 2 to 6, there is shown an example in which the in-focus control and the control of movement of the lens within the allowable range are effected on the basis of the absolute value of the current lens position from the lens barrel position detecting circuit, while in the embodiment of FIG. 7, there is shown an example of the circuit in which the in-focus control and the control of movement of the lens within the allowable range are effected on the basis of the lens movement amount information. In FIG. 7, reference character 4-A designates a down counter to the inputs $D_0-D_n$ of which is applied as an input the lens movement amount information $\Delta D$ from the current position to the in-focus position put out from the lens barrel displacement calculating circuit 2 of FIG. 1. A number of pulses corresponding to the amount of movement of the lens are applied as an input to the clock input CP of the down counter. These pulses are formed by a lens movement signal forming circuit comprising, as shown in FIG. 8A, a comb-tooth-like brush $MB_1$ and a sliding contact piece $MB_2$ for sliding the comb-tooth-like brush in response to movement of the lens, and the signal $MB_2$ slides the brush $MB_1$ by movement of the lens, whereby a number of pulses corresponding to the amount of sliding movement, namely, the amount of movement of the lens, are formed. As another example of the movement signal forming circuit, as shown in FIG. 8B, a light-and-dark pattern may be provided on a rotatable plate MD rotatable in response to a motor M for driving the lens, and this pattern may be illuminated by light-emitting means LED and the reflected light from the pattern may be received by a light-receiving element SPC, whereby a number of pulses corresponding to the amount of movement of the lens are applied to the clock input CP of the down-counter.

In the present embodiments, the lens movement signal forming circuit is provided to effect detection of the amount of movement of the lens and therefore, instead of the lens barrel position detecting circuit of FIG. 1, this signal forming circuit is connected to the clock input CP of the counter 4-A and the clock input CP of a counter D which will later be described.

The counter 4-A loads the movement amount information $\Delta D$ applied as an input to the input ends $D_0-D_n$ by the operation completion signal described in connection with FIG. 2, and thereafter down-counts the pulses from the signal forming circuit and renders the $\overline{\text{Carry out}}$ outputs into "0" when the count value becomes zero, and causes the AND gate 4-D to shift to "0" and causes the driving signal put out from the AND gates 4-4 and 4-5 of FIG. 2 to disappear. D designates an up-down counter to the inputs $D_0-D_2$ of which the earth potential is applied and to the most significant input $D_3$ of which a signal "1" is applied. The allowable width setting circuit is formed in the form of application of the input in this counter and the signal to the input portion thereof. As described above, "1" is applied only to the input portion $D_3$ and therefore, in the present embodiment, a digital value corresponding to 8 is set as the constant information K, but of course, this constant can be set to any value.

The direction signal obtained by the lens barrel displacement calculating circuit 2 is applied to the up-down mode change-over terminal U/D of the counter D, and the counter D operates in the up mode when the direction signal is "1", and operates in the down mode when the direction signal is "0".

Also, 8 as a constant is stored in the counter D and therefore, in the up mode, when the counter D counts 7 pulses, the $\overline{\text{Carry out}}$ output is rendered into "0" and, in the down mode, when the counter D counts 8 pulses, the $\overline{\text{Carry out}}$ output, is rendered into "0". By this "0" signal (inhibition signal), the output of the AND gate 4-D is rendered into "0" to thereby inhibit the driving of the lens thereafter, and the counter D serves both as the memory device and the limit value calculating circuit of FIG. 1.

Operation of the FIG. 7 embodiment will now be described.

Assuming that the switch SWL is in its OFF position, the counter D is inhibited from the counting operation. Consequently, the counter D does not effect its counting operation and always maintains the $\overline{\text{Carry out}}$ output at "1" even if an input pulse is applied to the terminal CP thereof.

On the other hand, the movement amount information $\Delta D$ to the in-focus point is applied from the lens barrel displacement calculating circuit 2 to the inputs $D_0$–$D_n$ of the counter 4-A, and this information $\Delta D$ is loaded by the operation completion signal "0" while, at the same time, the counter 4-A, becomes operative. When the information $\Delta D$ is other than zero, the $\overline{\text{Carry out}}$ output puts out "1" and the inverter 4-B inverts the operation completion signal and therefore, all of the inputs of the AND gate 4-D become "1" and thus, the AND gate 4-D puts out "1" and transmits it to one input end of the AND gates 4-4 and 4-5.

Since the direction signal is applied to the other input ends of the AND gates 4-4 and 4-5, the "1" signal is put out from one of the gates 4-4 and 4-5. Let it be assumed that the aforementioned direction signal puts out "1" when the lens is on the close distance side from the in-focus point. In such condition the AND gate 4-4 puts out "1" and therefore, as described in connection with FIG. 2, the motor is moved in the infinite distance direction by the "1" from this gate. Thus, pulses corresponding to the amount of movement of the lens are applied as an input to the counter 4-A, which thus effects down count. When the count value by this count reaches a value corresponding to the information $\Delta D$, the content of the counter 4-A becomes zero and therefore, the $\overline{\text{Carry out}}$ output is inverted to "0" and the output of the gate 4-D becomes "0", so that the output of the gate 4-4 also becomes "0", thus inhibiting the driving of the motor, i.e., the driving of the lens. By the above-described operation, the lens is moved toward the operated focus by an amount corresponding to the movement amount information $\Delta D$, and the distance adjusting operation based on the result of the operation is executed.

When the switch SWL is closed while the distance adjusting operation is being executed in the above-described operation, the counter D starts its counting operation. As described above, the constant 8 is present in this counter and therefore, the counter D starts its counting operation from a condition in which the preset value is 8.

Assuming that the direction signal representing the result of the operation of the calculating circuit 2 is "1" as in the above-described case, the counter D assumes the up mode and executes up count. As described above, in the up mode, the counter D renders the $\overline{\text{Carry out}}$ output into "1" until it counts 7 pulses and therefore, when the aforementioned movement amount information $\Delta D$ is of a value smaller than the value corresponding to 7, distance adjustment is executed in the above-described operation, but when the movement amount information $\Delta D$ is 7 or greater, the counter D counts 7 pulses before the $\overline{\text{Carry out}}$ output of the counter 4-A becomes "0", whereupon the $\overline{\text{Carry out}}$ output becomes "0". Consequently, in this case, when the lens has been moved in the direction of infinity by an amount corresponding to 7 pulses from the lens position when the switch SWL has been closed, that is, when the lens has been moved to $X + \Delta D_7$ (X is the lens position when the switch SWL has been closed and $\Delta D_7$ is the amount of movement of the lens corresponding to 7 pulses), the AND gate 4-D assumes "0" and the AND gate 4-4 also assumes "0", and thus, movement of the lens is inhibited.

Also, when the above-mentioned direction signal is "0", the counter D assumes the down count mode and therefore, when the counter D counts 8 pulses from the point of time whereat the switch SWL has been closed, the $\overline{\text{Carry out}}$ output becomes "0" and at that point of time, the driving of the lens is inhibited. Consequently, in this case, when the lens has been moved in the close distance direction by an amount $\Delta D_8$ corresponding to 8 pulses from the lens position when the switch SWL has been closed, that is, when the lens has been moved to the position $X - \Delta D_8$, movement of the lens is inhibited. Accordingly, in the present embodiment, movement of the lens by $\Delta D_7$ toward the infinity side and by $\Delta D_8$ toward the close distance side relative to the lens position X at the point of time whereat the switch SWL has been closed is allowed and thus, the lens is moved only within the range of $X + \Delta D_7$ to $X - \Delta D_8$.

As described above, in the automatic focus adjusting apparatus according to the present invention, movement of the lens within a predetermined allowable width is allowed for any designated distance value and therefore, when main object is caught in the distance measuring view field, the focusing following the movement of the main object within said allowable width can be executed and, when the main object deviates from the distance measuring view field, movement of the lens is inhibited at the limit value of said allowable width and thus, the lens can be prevented from being much out of focus with respect to the main object.

Further, in the present embodiment, an allowable range of a predetermined width is set relative to the current position of the lens and therefore, even if the main object shifts to a position beyond said allowable range, if the current position at that point of time is again set, a new allowable range can be set always about the current position of the main object while following the movement of the main object, and this is also effective for objects in great motion.

In the embodiment, the information corresponding to the current position of the lens is stored, but it is also of course possible to provide an information setting switch, set any position information by this switch and operate a predetermined allowable width for this set position. In such case, the information from said switch can be directly operated with a constant without a memory circuit being provided.

Also, in the embodiment, there is shown a focus adjusting apparatus of the type which repeats focusing operation, but the present invention is of course applicable to a so-called one-shot type focus adjusting apparatus (an apparatus which effects only one focusing operation). In such case, a predetermined distance value may be preset by a distance ring and any desired distance information may be set with the switch SWL closed, whereafter one-shot focusing operation may be effected.

What I claim is:

1. An auto focus apparatus for a camera having a distance measuring circuit for detecting object distance and forming an object distance signal, and a control circuit for driving a photo-taking lens on the basis of said object distance signal and effecting a distance adjusting operation to vary the focus of the photo-taking lens, said apparatus including:
   (a) a central distance value setting circuit for setting a central distance value representing the distance to an object for effecting an auto focus operation; and
   (b) an allowing circuit which allows the distance adjusting operation of said control circuit to focus the photo-taking lens only within distances different by a predetermined amount from the distance represented by the central distance value set by said setting circuit.

2. An auto focus apparatus for a camera having a distance measuring circuit for detecting object distance and forming an object distance signal, and a control circuit for driving a photo-taking lens on the basis of said object distance signal and effecting a distance adjusting operation to vary the focus of the photo-taking lens by changing the position thereof, said apparatus including:
   (a) a central distance value setting circuit for setting a central distance value representing the distance to an object for effecting an auto focus operation;
   (b) an allowable distance signal forming circuit for forming an allowable distance range signal representing a predetermined range of distances including the distance represented by the central distance value set by said setting circuit;
   (c) a lens position signal forming circuit for forming a set distance signal corresponding to the position of the photo-taking lens; and
   (d) a stop signal forming circuit for detecting said allowable distance range signal and said set distance signal and forming a stop signal for stopping the distance adjusting operation of said control circuit when the set distance exceeds the allowable distance range.

3. An auto focus apparatus for a camera having a distance measuring circuit for detecting object distance and forming an object distance signal, and a control circuit for driving a photo-taking lens on the basis of said object distance signal and effecting a distance adjusting operation to vary the focus of the photo-taking lens by changing the position thereof, said apparatus including:
   (a) a central distance value setting circuit for setting a central distance value representing the distance to an object for effecting an auto focus operation;
   (b) an allowable distance signal forming circuit for forming an allowable distance range signal representing a predetermined range of distances including the distance represented by the central distance value set by said setting circuit;
   (c) a lens position signal forming circuit for forming a set distance signal corresponding to the position of the photo-taking lens; and
   (d) a stop signal forming circuit for comparing said allowable distance range signal and said set distance signal and forming a stop signal for stopping the distance adjusting operation of said control circuit when the set distance becomes coincident with a limit of the allowable distance range.

4. An auto focus apparatus for a camera having a distance measuring circuit for detecting object distance and forming an object distance signal, and a control circuit for driving a photo-taking lens on the basis of said object distance signal and effecting a distance adjusting operation to vary the focus of the photo-taking lens by changing the position thereof, said apparatus including:
   (a) an operating member for changing the position of the photo-taking lens;
   (b) a memory circuit for storing therein a central distance value representing the distance to an object corresponding to the position of the photo-taking lens provided by operation of said operating member; and
   (c) an allowing circuit which allows the distance adjusting operation of said control circuit to focus the photo-taking lens only within distances different by a predetermined amount from the distance represented by the central distance value stored in said memory circuit.

5. An auto focus apparatus for a camera having a distance measuring circuit for detecting object distance and forming an object distance signal, and a control circuit for driving a photo-taking lens on the basis of said object distance signal and effecting a distance adjusting operation to vary the focus of the photo-taking lens by changing the position thereof, said apparatus including;
   (a) an operating member for changing the position of the photo-taking lens;
   (b) a memory circuit for storing therein a central distance value representing the distance to an object corresponding to the position of the photo-taking lens provided by operation of said operating member;
   (c) an allowable distance value forming circuit for forming an allowable distance value signal representing a predetermined range of distances including the distance represented by the central distance value stored in said memory circuit; and
   (d) a stop signal forming circuit for comparing said allowable distance value and a set distance value corresponding to the current position of the phototaking lens and forming a stop signal stopping the distance adjusting operation of said control circuit when the set distance value reaches a limit of the allowable distance value.

6. An auto focus apparatus for a camera having a distance measuring circuit for detecting object distance and forming an object distance signal, and a control circuit for driving a photo-taking lens on the basis of said object distance signal and effecting a distance adjusting operation to vary the focus of the photo-taking lens by changing the position thereof, said apparatus including:

(a) an allowable distance value signal forming circuit for forming an allowable distance value signal representing a predetermined range of distances having a predetermined allowable width and including a central distance value representing the distance to an object corresponding to the position of the photo-taking lens;

(b) an operating member for changing the position of the photo-taking lens;

(c) a memory circuit for storing therein said allowable distance value signal based on the central distance value at a particular position of the photo-taking lens; and (d) a stop signal forming circuit for comparing said allowable distance value and a set distance value corresponding to the current position of the photo-taking lens and forming a stop signal for stopping the distance adjusting operation of said control circuit when the set distance value reaches a limit of the allowable distance value.

7. An auto focus apparatus for a camera having a distance measuring circuit for detecting object distance and forming an object distance signal, and a control circuit for driving a photo-taking lens on the basis of said object distance signal and effecting a distance adjusting operation to vary the focus of the photo-taking lens by movement thereof, said apparatus including:

(a) a stop signal forming circuit for detecting movement of the photo-taking lens and generating a stop signal when the photo-taking lens has been moved by a predetermined allowable amount from the current position thereof; and (b) inhibition means for inhibiting the distance adjusting operation of said control circuit in response to said stop signal.

8. An auto-focus apparatus for adjusting a lens to an in-focus position comprising:

(a) setting means for setting position information representing a predetermined lens position;

(b) allowing means for allowing a lens position adjusting operation within a predetermined range between lens positions that focus the lens at predetermined distances in front of and behind the focus position represented by the position information set by said setting means.

9. An auto-focus apparatus for adjusting a photo-taking lens to an in-focus position, comprising:

(a) setting means for setting position information corresponding to a preset position of the photo-taking lens;

(b) allowing means for allowing a lens position adjusting operation within a predetermined range between lens positions that focus the lens at predetermined distances in front of and behind the focus position represented by the position information set by said setting means.

* * * * *

UNITED STATES PATENT AND TRADEMARK OFFICE
CERTIFICATE OF CORRECTION

PATENT NO. : 4,557,577
DATED : December 10, 1985
INVENTOR(S) : NOBUHIKO SHINODA

It is certified that error appears in the above-identified patent and that said Letters Patent is hereby corrected as shown below:

Column 5, line 7, "the substractor," should read
--the subtractor,--.

Column 6, line 51, "respetitively" should read
--respectively--.

Column 7, line 14, "put our" should read --put out--.

Column 8, line 33, "down counter" should read
--down-counter--.

Column 9, line 19, "output, is" should read
--output is--.

Column 12, line 46, "including;" should read
--including:--.

Signed and Sealed this

Twenty-first Day of October, 1986

[SEAL]

Attest:

DONALD J. QUIGG

Attesting Officer     Commissioner of Patents and Trademarks